United States Patent
Chou

(10) Patent No.: US 11,601,206 B2
(45) Date of Patent: Mar. 7, 2023

(54) TRANSMIT-SIGNAL STRENGTH INDICATOR CIRCUIT AND TRANSMITTING CIRCUIT

(71) Applicant: REALTEK SEMICONDUCTOR CORPORATION, Hsinchu (TW)

(72) Inventor: Chien-I Chou, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 17/376,156

(22) Filed: Jul. 15, 2021

(65) Prior Publication Data

US 2022/0385379 A1 Dec. 1, 2022

(30) Foreign Application Priority Data

May 25, 2021 (TW) .................................. 110118879

(51) Int. Cl.
- H04B 17/10 (2015.01)
- H04B 1/04 (2006.01)
- H04B 1/16 (2006.01)

(52) U.S. Cl.
CPC ............. H04B 17/102 (2015.01); H04B 1/04 (2013.01); H04B 1/16 (2013.01)

(58) Field of Classification Search
CPC ........... H04B 17/102; H04B 1/04; H04B 1/16
See application file for complete search history.

(56) References Cited

U.S. PATENT DOCUMENTS

| | | | |
|---|---|---|---|
| 10,523,126 B1 * | 12/2019 | Li | G05F 3/262 |
| 10,686,430 B1 * | 6/2020 | Sanchez | H04B 1/16 |
| 2007/0008038 A1 * | 1/2007 | Klepser | H03F 3/45183 |
| | | | 375/345 |
| 2009/0054018 A1 * | 2/2009 | Waheed | H03G 3/3047 |
| | | | 455/127.1 |

(Continued)

FOREIGN PATENT DOCUMENTS

TW 200642324 A 12/2006

OTHER PUBLICATIONS

English Abstract Translation of TW200642324A.
(Continued)

*Primary Examiner* — Nguyen T Vo
(74) *Attorney, Agent, or Firm* — WPAT, P.C., Intellectual Property Attorneys; Anthony King

(57) ABSTRACT

A signal strength indicator circuit, configured to detect a power of an output signal outputted by a power amplifier, includes a voltage gain circuit, a current gain circuit, a multiplier, and a buffer stage. The voltage gain circuit provides a first gain to the output signal to generate a first value of an indicating voltage when a voltage of the output signal is not greater than a threshold, and provides a second gain to generate a second value of the indicating voltage when the voltage of the output signal is greater than the threshold. The first gain is greater than the second gain. The current gain circuit generates an indicating current according to an input signal corresponding to the output signal. The multiplier multiplies the indicating voltage and the indicating current to generate an indicating power. The buffer stage converts the indicating power to the indicating signal.

9 Claims, 2 Drawing Sheets

(56) References Cited

U.S. PATENT DOCUMENTS

2011/0273164 A1* 11/2011 Dupuis .................. G01R 21/07
327/356
2013/0334889 A1* 12/2013 Hu .......................... H02M 7/12
307/82
2016/0211880 A1*  7/2016 Choi ........................ H03F 3/245
2016/0334444 A1* 11/2016 Chen ...................... G01R 21/07

OTHER PUBLICATIONS

Yuan-Hung Chung, Po-Yu Chang, Meng-Hsiung Hung, Ming-Yeh Hsu, Che-Hung Liao, Chun-Wei Lin, Dual-Band Integrated Wi-Fi PAs with Load-Line Adjustment and Phase Compensated Power Detector, IEEE Radio Frequency Integrated Circuits Symposium, 2015.

Brecht Francois, Patrick Reynaert, A Transformer-Coupler True-RMS Power Detector in 40nm CMOS, 2014 IEEE International Solid-State Circuits Conference, Feb. 10, 2014.

\* cited by examiner

TRANSMIT-SIGNAL STRENGTH INDICATOR CIRCUIT AND TRANSMITTING CIRCUIT

CROSS-REFERENCE TO RELATED APPLICATIONS

This application claims the benefit of priority to Patent Application No. 110118879, filed in Taiwan on May 25, 2021, which is incorporated by reference in its entirety.

TECHNICAL FIELD

The present application relates to a circuit, particularly a strength indicator circuit and a related transmitting circuit.

BACKGROUND

Transmitting circuits are used in various wireless communication applications, and different transmission protocols specify the power range of the transmitted power of the transmitting circuit. Conventionally, the transmission circuit uses a power detector to detect the strength of the output signal and generates an indication of the transmitted signal strength based on the detected strength, wherein the indication indicates the transmitted power of the transmitting circuit. However, different transmission devices (e.g., antennas) or environmental factors (e.g., temperature) may cause the transmitted power to change, thereby causing the output signal strength to fail to meet the specifications of the transmission protocol. Furthermore, some transmission protocols specify a range of transmitted power up to 35 dB, and power detectors in conventional technologies cannot cover such a measurement range, resulting in inaccurate measurements. Therefore, how to adjust the measurement range of the power detector to cover the power range specified by the transmission protocol has become one of the most important issues of the related field.

SUMMARY OF THE INVENTION

Some embodiments of the present disclosure provide a signal strength indicator circuit configured to detect a power of an output signal outputted by a power amplifier. The signal strength indicator circuit includes a voltage gain circuit, a current gain circuit, a multiplier, and a buffer stage. The voltage gain circuit is configured to provide a first voltage gain to the output signal to generate a first value of an indicating voltage when a voltage of the output signal is no greater than a threshold, and provide a second voltage gain to the output signal to generate a second value of the indicating voltage when the voltage of the output signal is greater than the threshold. The first voltage gain is greater than the second voltage gain. The current gain circuit is configured to generate an indicating current according to an input signal corresponding to the output signal. The multiplier is configured to multiply the indicating voltage and the indicating current to generate an indicating power. The buffer stage is configured to convert the indicating power into an indicating signal to indicate the power of the output signal.

Some embodiments of the present disclosure provide a transmitting circuit, which includes a power amplifier, a processing circuit, and a signal strength indicator circuit. The power amplifier is configured to amplify an input signal according to a power gain of the power amplifier to generate an output signal. The processing circuit is configured to adjust the power gain according to an indicating signal. The signal strength indicator circuit has a plurality of power detection ranges. The signal strength indicator circuit is configured to uses one of the plurality of power detection ranges to detect a power of the output signal to generate the indicating signal.

The signal strength indicator circuit and the transmitting circuit of the present application detect the strength of the output signal by using several different power detection ranges corresponding to several different gains to improve the dynamic range of the signal strength indicator circuit compared to the known techniques.

DETAILED DESCRIPTION

Figure 1:
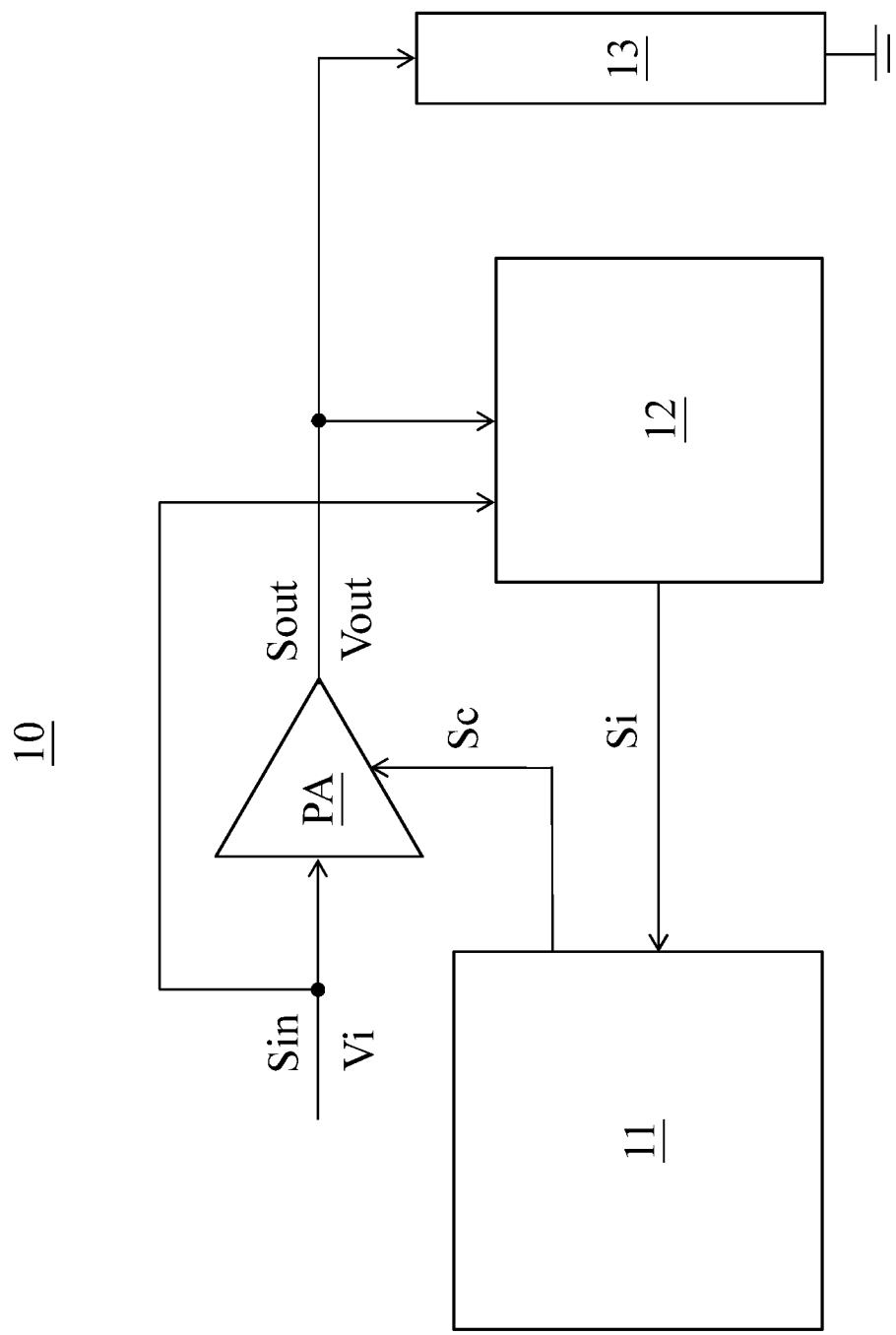
FIG. 1 is a schematic diagram illustrating a transmitting circuit according to some embodiments of the present disclosure.

FIG. 1 is a schematic diagram illustrating a transmitting circuit 10 according to some embodiments of the present disclosure. The transmitting circuit 10 includes a processing circuit 11, a power amplifier PA, a signal strength indicator circuit 12, and an output load 13. The transmitting circuit 10 is configured to transmit an output signal Sout to a receiving terminal (not shown in the drawings), wherein the processing circuit 11 generates a control signal Sc according to an indicating signal Si to adjust a power gain of the power amplifier PA, and the power amplifier PA amplifies the input signal Sin according to the power gain to generate the output signal Sout. The input terminal of the power amplifier PA configured to receive the input signal Sin has an input voltage Vi. Because of the output load 13, the output terminal of the power amplifier PA configured to output the output signal Sout has an output voltage Vout. The signal strength indicator circuit 12 is configured to detect the power of the output signal Sout and generate the indicating signal Si according to the input signal Sin and the output signal Sout.

In some embodiments, the transmitting circuit 10 is limited by the specification of the transmission protocol so that the power of the output signal Sout outputted by the transmitting circuit 10 is limited between a predetermined upper limit and a predetermined lower limit. Therefore, the signal strength indicator circuit 12 is configured to measure the power of the output signal Sout, and the signal strength indicator circuit 12 generates the indicating signal Si according to the input signal Sin and the output signal Sout to indicate whether the power of the output signal Sout falls within the specified range. In some embodiments, the indicating signal Si is also referred to as a transmitted signal strength indicator (TSSI). For example, the 802.11ax standard used in WiFi 6 specifies that the power of the output signal Sout should be between −10 dBm and 25 dBm. Based on this power range, the signal strength indicator circuit 12 must be able to measure the output signal Sout within this power range. However, in some existing technologies, it is difficult for the power detector to detect power in the range of −10 dBm to 25 dBm, making the measurement accuracy poor. Therefore, the signal strength indicator circuit 12 provided in this application can measure different power ranges using different gains to solve the issues encountered in the prior art. The details are described below.

Figure 2:
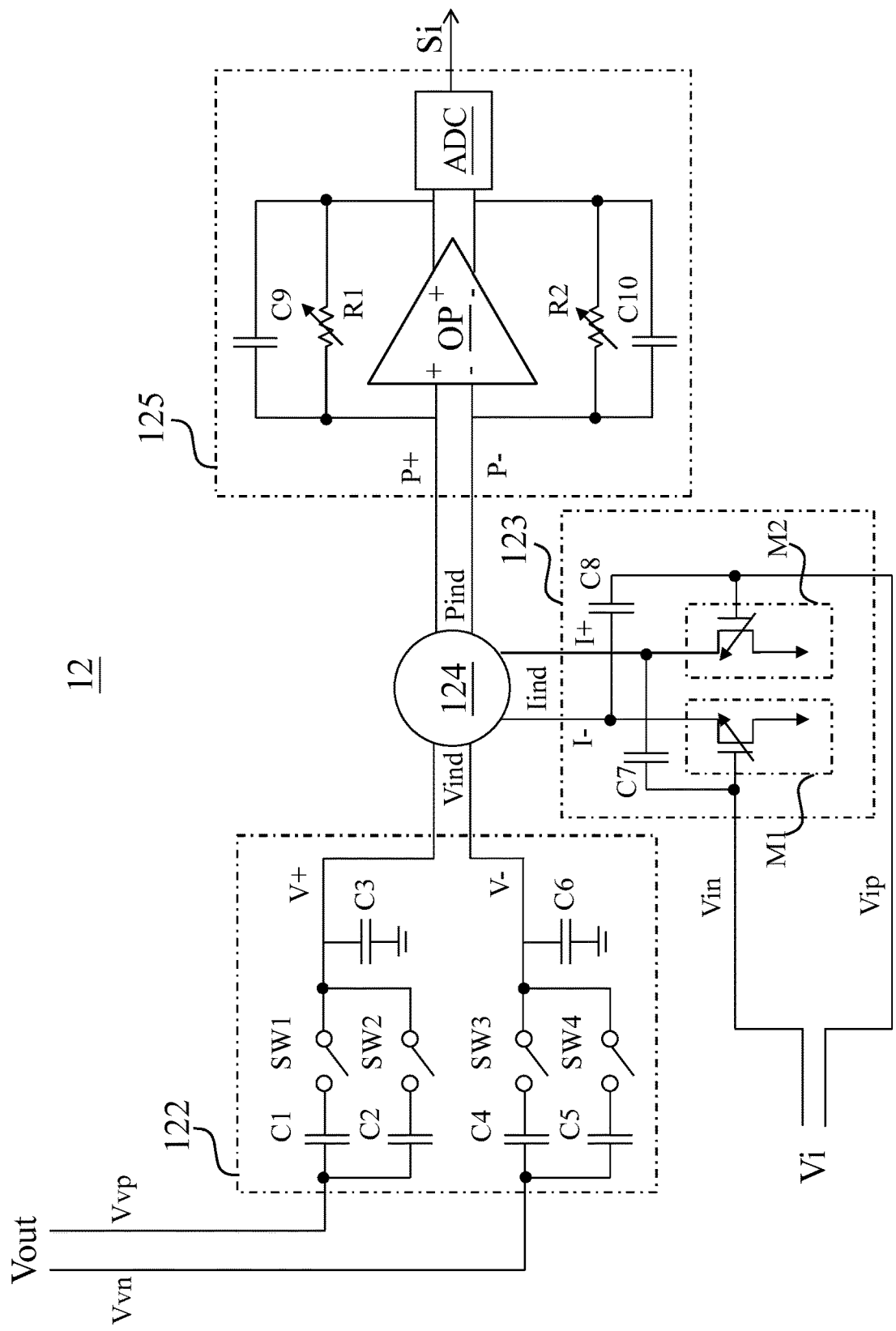
FIG. 2 is a schematic diagram illustrating a signal strength indicator circuit according to some embodiments of the present disclosure.

Reference is made to FIG. 2. FIG. 2 is a schematic diagram illustrating the signal strength indicator circuit 12. The signal strength indicator circuit 12 includes a voltage gain circuit 122, a current gain circuit 123, a multiplier 124, and a buffer stage 125. The power amplifier PA of FIG. 1 converts an input voltage Vi (corresponding to the input signal Sin) into a signal Vout according to power gain. The voltage gain circuit 122 receives the output voltage Vout to generate an indicating voltage Vind. The current gain circuit 123 receives the input voltage Vi to generate an indicating current Iind. The multiplier 124 is configured to multiply the indicating voltage Vind and the indicating current Iind to generate an indicating power Pind. The buffer stage 125 converts the indicating power Pind into the indicating signal Si to output.

In some embodiments, the output voltage Vout is a differential pair, including a positive output voltage Vvp and a negative output voltage Vvn. The voltage gain circuit 122 receives the positive output voltage Vvp and the negative output voltage Vvn, and outputs a positive indicating voltage V+ and a negative indicating voltage V− of the indicating voltage Vind. The input voltage Vi is a differential pair, including a positive input voltage Vip and a negative output voltage Vin. The current gain circuit 123 receives the positive input voltage Vip and the negative input voltage Yin, and outputs a positive indicating current I+ and a negative indicating current I− of the indicating current find.

In some embodiments, the voltage gain circuit 122 includes a set of positive voltage paths formed by a capacitor C1, a capacitor C2, a capacitor C3, a switch SW1, and a switch SW2. As shown in FIG. 2, the first terminal of the capacitor C1 and the first terminal of the capacitor C2 receive the positive output voltage Vvp of the output voltage Vout, the first terminal of the switch SW1 and the first terminal of the switch SW2 are respectively coupled to the second terminal of the capacitor C1 and the second terminal of the capacitor C2, the second terminal of the switch SW1 and the second terminal of the switch SW2 are coupled to the first terminal of the capacitor C3, and the second terminal of the capacitor C3 is coupled to the ground terminal, wherein the first terminal of the capacitor C3 is further coupled to the multiplier 124.

The voltage gain circuit 122 can switch between a first voltage gain configuration and a second voltage gain configuration by controlling the conduction status of the switch SW1 and the switch SW2, and it is switched among multiple power detection ranges correspondingly. Different voltage gain configurations can generate the indicating voltage Vinci having different values.

When the switch SW1 is conducted, and the switch SW2 is not conducted (the first voltage gain configuration), the positive output voltage Vvp is received at the first terminal of the capacitor C1, and a positive indicating voltage V+ is generated at the first terminal of the capacitor C3. Because the second terminal of the capacitor C3 is connected to the ground, the voltage of the positive indicating voltage V+ can be expressed by the voltage of the positive output voltage Vvp and the voltage divided ratio of the capacitor C1 and the capacitor C3: (V+=Vvp*C1/(C1+C3)).

When the switch SW1 is not conducted, and the switch SW2 is conducted (the second voltage gain configuration), the positive output voltage Vvp is received at the first terminal of the capacitor C2, and a positive indicating voltage V+ is generated at the first terminal of the capacitor C3. Similarly, the voltage of the positive indicating voltage V+ can be expressed by the voltage of the positive output voltage Vvp and the voltage divided ratio of the capacitor C2 and the capacitor C3: (V+=Vvp*C2/(C2+C3)).

In some embodiments, the capacitance of the capacitor C1 is greater than the capacitance of the capacitor C3, and the capacitance of the capacitor C3 is greater than the capacitance of the capacitor C2. In view of the foregoing relationships between capacitances, when the switch SW1 is conducted, and the switch SW2 is not conducted, the voltage gain circuit 122 forms the first voltage gain configuration and generates a greater positive indicating voltage V+, whereas when the switch SW1 is not conducted, and the switch SW2 is conducted, the voltage gain circuit 122 forms the second voltage gain configuration and generates a smaller positive indicating voltage V+. In other words, the voltage gain circuit 122 is configured to determine the voltage gain from the positive output voltage Vvp to the positive indicating voltage V+ based on the conduction status of the switch SW1 and the switch SW2. That is, when the voltage gain circuit 122 forms the first voltage gain configuration (the switch SW1 is conducted and the switch SW2 is not conducted), the voltage gain circuit 122 provide a greater voltage gain, whereas when the voltage gain circuit 122 forms the second voltage gain configuration (the switch SW1 is not conducted and the switch SW2 is conducted), the voltage gain circuit 122 provide a smaller voltage gain.

When the voltage of the positive output voltage Vvp is greater than a threshold, in order to keep the voltage of the positive indicating voltage V+ within the upper limit that can be handled by the multiplier 124, the voltage gain circuit 122 is configured to obtain a smaller voltage gain by making the switch SW1 be non-conducted and the switch SW2 be conducted (i.e., the second voltage gain configuration), so as to gain the voltage output voltage Vvp to the positive indicating voltage V+. In contrast, when the voltage of the positive output voltage Vvp is lower than the threshold, in order to keep the voltage of the positive indicating voltage V+ from falling below the lower limit that can be handled by the multiplier 124, the voltage gain circuit 122 is configured to obtain a greater voltage gain by making the switch SW1 be conducted and the switch SW2 be non-conducted (i.e., the first voltage gain configuration), so as to gain the positive output voltage Vvp to the positive indicating voltage V+. In summary, the voltage gain circuit 122 can use different voltage gains to generate positive output voltages Vvp in different voltage ranges into positive indicating voltages V+ for subsequent power detection operations.

In some embodiments, at least one of the switch SW1 and the switch SW2 is conducted.

In some embodiments, the voltage gain circuit 122 further includes a set of negative voltage paths formed by a capacitor C4, a capacitor C5, a capacitor C6, a switch SW3, and a switch SW4 forms. The capacitor C4, the capacitor C5, the capacitor C6, the switch SW3, and the switch SW4 are configured to generate a negative indicating voltage V− according to the negative output voltage Vvn. In these cases, the capacitor C4, the capacitor C5, the capacitor C6, the switch SW3, and the switch SW4 corresponds respectively to the capacitor C1, the capacitor C2, the capacitor C3, the switch SW1, and the switch SW2, and have identical connection relationships and operations (e.g., the negative voltage path may have the same first voltage gain configuration and second voltage gain configuration as the positive voltage path, and both paths can operate under the corresponding gain configurations). Therefore, details of the capacitor C4, the capacitor C5, the capacitor C6, the switch SW3, and the switch SW4 are omitted herein for the sake of brevity.

The current gain circuit 123 includes a transconductor M1, a transconductor M2, a capacitor C7, and a capacitor C8. The receiving terminals of the transconductor M1 and the transconductor M2 are respectively configured to receive the positive input voltage Vip and the negative input voltage Vin, and generate a negative indicating current I− and a positive indicating current I+ at the output terminals of the transconductor M1 and the transconductor M2, respectively. The transconductor M1 and the transconductor M2 have a current source (not shown in the drawings); in some embodiments, the transconductor M1 and the transconductor M2 share the same current source. The first terminal of capacitor C7 is coupled to the receiving terminal of the transconductor M1, and the second terminal of the capacitor C7 is coupled to the output terminal of the transconductor M2. Correspondingly, the first terminal of the capacitor C8 is coupled to the receiving terminal of the transconductor M2, and the second terminal of the capacitor C8 is coupled to the output terminal of the transconductor M1. In some embodiments, the capacitor C7 and the capacitor C8 are configured to adjust the phase of the positive indicating current I+ and the negative indicating current I− to improve the detection accuracy.

The transconductor M1 and the transconductor M2 respectively have multiple transistors connected in parallel (for the sake of brevity, only one transistor is shown in FIG. 2, and an arrow is used to show that it is variable). When different numbers of the transistors are conducted, the transconductor M1 and the transconductor M2 can provide different current gains to the positive input voltage Vip and the negative input voltage Vin. In other words, the transconductor M1 and the transconductor M2 form different current gain configurations (each corresponding to a power detection range) by conducting different transistors. For example, when more or larger transistors are conducted, the equivalent channel is wider, so the transconductor M1 and the transconductor M2 can generate a greater current, and hence a greater current gain. In contrast, when fewer or smaller transistors are conducted, the equivalent channel is narrower, so the transconductor M and thy: transconductor M2 can only generate a smaller current, hence a smaller current gain.

The multiplier 124 is configured to receive the positive indicating voltage V+ and the negative indicating voltage V− generated by the voltage gain circuit 122 and the positive indicating current I+ and the negative indicating current I− generated by the current gain circuit 123; and then multiply the positive indicating voltage V+ and the positive indicating current I+ and multiply the negative indicating voltage V− and the negative indicating current I−, so as to generate the indicating power Pind. The indicating power Pind includes an indicating power P+ and an indicating power P−, in which the indicating power is obtained by multiplying the positive indicating voltage V+ and the positive indicating current I+, and the indicating power P− is obtained by multiplying the negative indicating voltage V− and the negative indicating current I−.

The buffer stage 125 includes an amplifier OP, an analog-to-digital converter ADC, a capacitor C9, a capacitor C10, a resistor R1, and a resistor R2. The amplifier OP is coupled to the multiplier 124 and configured to amplify the indicating power Pind. The analog-to-digital converter ADC is coupled to the amplifier OP and configured to convert the amplified indicating power Pind into the indicating signal Si. The capacitor C9, the capacitor C10, the resistor R1, and the resistor R2 are connected across the input terminal and the output terminal of the amplifier OP.

In some embodiments, the buffer stage 125 has a positive input terminal, a negative input terminal, a positive output terminal, and a negative output terminal. The capacitor C9 and resistor R1 are connected across the positive input terminal and the positive output terminal of the amplifier OP, and the capacitor C10 and the resistor R2 are connected across the negative input terminal and the negative output terminal of the amplifier OP. The positive input terminal and the negative input terminal of the amplifier OP are respectively configured to receive the indicating power P+ and the indicating power P−.

In some embodiments, the analog-to-digital converter ADC has a low resistance, and the resistor R1, the resistor R2, the capacitor C9, and the capacitor C10 coupled in front of the analog-to-digital converter ADC are implemented using a low-pass filter, which is configured to eliminate the noise on the indicating power Pind. In some embodiments, the resistor R1 and the resistor R2 are variable resistors. The gain of the buffer stage 125 and the passband of the above-mentioned low-pass filter can be adjusted by adjusting the resistance of the resistor R1 and the resistance of the resistor R2.

The foregoing outlines features of several embodiments so that those skilled in the art may better understand various aspects of the present disclosure, Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent embodiments still fall within the spirit and scope of the present disclosure, and they may make various changes, substitutions, and alterations thereto without departing from the spirit and scope of the present disclosure.

What is claimed is:

1. A signal strength indicator circuit, configured to detect a power of an output signal outputted by a power amplifier, wherein the power amplifier is configured to provide a power gain to an input signal to output the output signal, comprising:
    a voltage gain circuit, configured to provide a first voltage gain to the output signal to generate a first value of an indicating voltage when a voltage of the output signal is no greater than a threshold, and provide a second voltage gain to the output signal to generate a second value of the indicating voltage when the voltage of the output signal is greater than the threshold, wherein the first voltage gain is greater than the second voltage gain;
    a current gain circuit, configured to generate an indicating current according to the input signal corresponding to the output signal;
    a multiplier, configured to multiply the indicating voltage and the indicating current to generate an indicating power; and
    a buffer stage, configured to convert the indicating power into an indicating signal for controlling the power gain, wherein the indicating signal indicates the power of the output signal.

2. The signal strength indicator circuit of claim 1, wherein the voltage gain circuit comprises:
    a first capacitor;
    a second capacitor, wherein a first terminal of the first capacitor and a first terminal of the second capacitor are configured to receive the output signal;

a first switch, wherein a first terminal of the first switch is coupled to a second terminal of the first capacitor, and a second terminal of the first switch is coupled to the multiplier;

a second switch, wherein a first terminal of the second switch is coupled to a second terminal of the second capacitor, and a second terminal of the second switch is coupled to the multiplier, wherein during the operation of the voltage gain circuit, at least one of the first switch and the second switch is conducted; and a third capacitor, coupled between the second terminal of the first switch and a ground terminal.

3. The signal strength indicator circuit of claim 2, wherein when the first switch is conducted and the second switch is not conducted, the voltage gain circuit uses the first voltage gain, and when the second switch is conducted and the first switch is not conducted, the voltage gain circuit uses the second voltage gain.

4. The signal strength indicator circuit of claim 2, wherein a capacitance of the first capacitor is greater than a capacitance of the third capacitor, and the capacitance of the third capacitor is greater than the capacitance of the second capacitor.

5. The signal strength indicator circuit of claim 1, wherein the current gain circuit provides a first current gain to the input signal to generate a first value of the indicating current or provides a second current gain to the input signal to generate a second value of the indicating current.

6. The signal strength indicator circuit of claim 5, wherein the current gain circuit comprises:
a transconductor, configured to generate the indicating current according to the input signal.

7. The signal strength indicator circuit of claim 6, wherein the transconductor comprises a first transistor and a second transistor connected in parallel, wherein when the first transistor is conducted, the current gain circuit provides the first current gain to the input signal, and when the first transistor is not conducted, the current gain circuit provides the second current gain to the input signal.

8. The signal strength indicator circuit of claim 1, wherein the buffer stage comprises:
an amplifier, coupled to the multiplier and configured to amplify the indicating power; and
an analog-to-digital converter, coupled to the amplifier and configured to convert the amplified indicating power into the indicating signal.

9. The signal strength indicator circuit of claim 8, wherein the buffer stage further comprises:
a fourth capacitor, connected across an input terminal and an output terminal of the amplifier; and
a resistor, connected in parallel with the fourth capacitor.

* * * * *